Oct. 10, 1933.  W. C. PUTNAM  1,929,515
AUTOMATIC FLUID CONTROL
Filed April 1, 1929
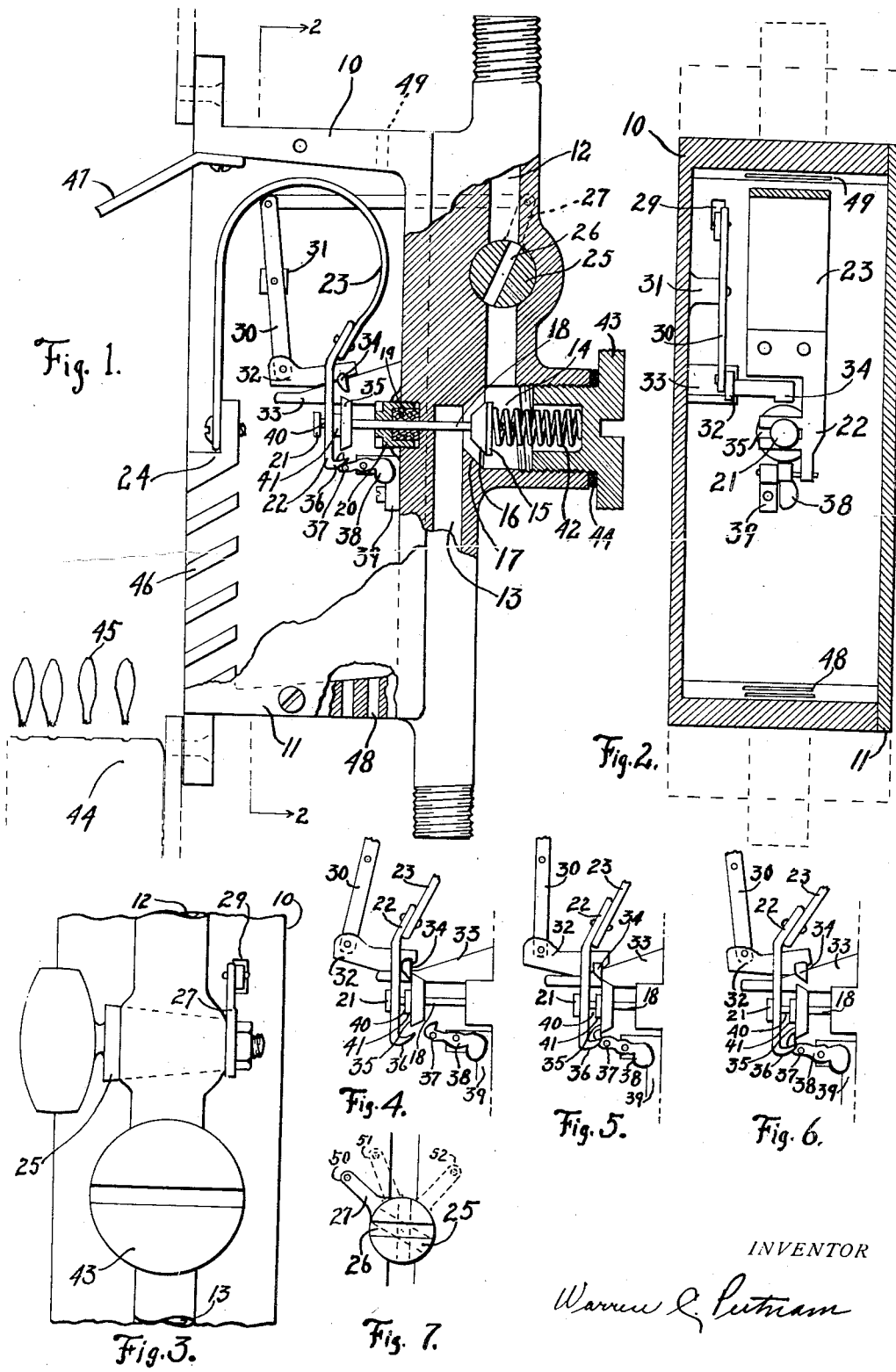
INVENTOR
Warren C. Putnam Patented Oct. 10, 1933

1,929,515

UNITED STATES PATENT OFFICE 1,929,515

AUTOMATIC FLUID CONTROL

Warren C. Putnam, Los Angeles, Calif.

Application April 1, 1929. Serial No. 351,592

6 Claims. (Cl. 158—117.2)

My invention relates to thermostatic control of valves with special reference to gas heating devices, and while they are adapted to wide application, they are particularly suitable in conjunction to gas heaters as a means for safeguarding against the possibility of escape of unlighted or raw gas with the consequent danger of explosion or asphyxiation.

The principal object of the present invention is to provide an apparatus of the above type, whereby the operator in turning on the gas-cock to the heater, automatically opens and sets the thermostatically controlled shut-off valve before the gas-cock has turned sufficiently to admit gas to the heater burner, and wherein, once the burner is lighted, and any appreciable amount of heat generated, the shut-off valve is contacted by the heated thermostat in its expansion travel, and is thereafter actuated by the movements of the thermostat. Any subsequent cessation of the supply of gas, or the combustion of the same, and the consequent absence of heat, allows the thermostat to return to original or cold position, thereby closing the shut-off valve, and effectually stopping all supply of gas to the burner.

Another object is to provide a safety shut-off valve which will in no way interfere with the normal operation of a gas appliance, but which will automatically become effective as a shut-off valve upon the cessation of the supply of either gas, or heat from the combustion of the same, thus preventing asphyxiation from either a temporary failure of the supply of gas, or the extinguishing of the flame in a gas appliance.

To the above and other purposes my invention consists in the novel construction, arrangement and combination of parts as hereinafter fully, clearly and concisely described, definitely pointed out in my claims and illustrated by the accompanying drawing (1 sheet) in which—

Fig. 1 is a side elevation, partly in section, showing the gas-cock partly open, the shut-off valve open and so retained by the thermostat.

Fig. 2 is a front elevation in section taken on the line, 2—2 of Fig. 1.

Fig. 3 is a view of a fragment of the structure from the rear showing the gas-cock.

Fig. 4 is a diagrammatic view of the shut-off valve contacts with the thermostat contacts and the trips in an off or non-operating position.

Fig. 5 is a diagrammatic view similar to Fig. 4, showing the same parts in their relative positions when the gas-cock has been turned partly on.

Fig. 6 is a diagrammatic view similar to Figs. 4 and 5, showing the same parts in their relative positions when the gas-cock has been turned more fully on.

Fig. 7 is a diagram of several positions of the gas-cock relative to Figs. 4, 5 and 6.

This automatic fluid control comprises a casing 10 one side of which has a removable section or door 11 providing ease of access, assembly and construction, said casing 10 has integral with it a gas inlet chamber 12, and an outlet chamber 13, and a valve chamber 14, in which is located shut-off valve 15, provided with a frusto-conical seating face 16, shaped to fit valve seat 17 in casing 10.

Shut-off valve 15 is secured upon a valve stem 18, which operates through a gas-tight packing 19, in packing box 20. Valve stem 18 has secured to one end contact head 21 shaped to engage the thermostat contact 22 secured to the pliable end of thermostat 23, which is secured at the other end to casing 10 as at mounting 24.

Inlet chamber 12 in casing 10 is intercepted by gas-cock 25 having within it a passage 26, and secured to the outside of said gas-cock is a lever 27, to which is connected arm 28, which passes through a port 29 in casing 10 and is connected to a rocking arm 30 mounted on boss 31 within casing 10. Said arm 30 carries on its lower end a loosely connected setting lever 32, which rides upon an inclined plane or guide 33 integral with casing 10.

The setting lever 32 carries a projection in the form of a dog 34 which within its reciprocating movements engages and actuates valve stem head 35 to move it to open shut-off valve 15.

Thermostat contact 22 carries at its lower end a cam 36 which contacts pin 37 in latch 38 to release the same from engagement with valve stem head 35. Said latch 38 is loosely mounted on boss 39 of casing 10 and is gravity positioned to engage and restrain valve stem head 35 upon contact.

Valve stem 18 has at one end contact head 21 to engage thermostat contact 22 and actuate same, and is further provided with a space at 40 to allow a limited longitudinal movement of either the thermostat contact 22 or the valve stem 18, the said space at 40 being controlled by the thickness of a shim 41.

To insure the proper longitudinal movements of valve stem 18 there is provided a tension spring 42 in valve chamber 14, one end of which bears upon shut-off valve 15, the other end being retained within a screw plug 43 provided with a gasket 44.

In Fig. 1 is shown a portion of a gas burner 44, and a flame 45, and to insure a proper presentation of the heat from such a flame to the thermostat 23, there are provided spaced fins 46, integral with casing 10 inclined to direct heat movement, also a heat deflector 47 is provided at the top of the front opening in casing 10. To provide against over heating of that portion of casing 10 forming one side of inlet chamber 12 and outlet chamber 13, there are provided vents as at 48 in the lower portion of casing 10 and as at 49 in casing 10, thus providing a current of cooler air next to the rear wall of the casing 10.

Fig. 7 shows in diagrammatical form three positions of lever 27 attached to gas-cock 25, the first or off position as at 50, and in dotted lines a second position as at 51 corresponding to the positions of the various parts as shown in Fig. 5 at that point of movement, and a position as at 52 assumed to be turned fully on, and corresponding to the positions of the various parts as shown in Fig. 6.

Assuming the structure to be assembled as set forth in the accompanying drawing, with the device attached to any gas heater appliance having a burner as 44 which may act as a source of heat, with the gas-cock at off position wherein the passage 26 in Fig. 7 will be at the opposing position relative to inlet chamber 12, at which position through the several connections trip lever 32 is at the position shown in Fig. 4, which may be termed original position, and assuming that the thermostat 23 is cold and together with thermostat contact 36 is in the position shown in Fig. 4 wherein it is bearing with the required tension upon contact head 21 to cause shut-off valve 15 to be firmly seated in valve seat 17, and all gas access shut off from the burner, I will describe the sequence of operation:

Turning on of gas-cock 25 operates through its connections dog 34, which is in contact with the face of valve stem head 35, which actuates valve stem 18 and shut-off valve 15 to move the same longitudinally to a point where the shut-off valve 15 is open. At this point of movement, as illustrated by position of parts in Fig. 5, and the gas-cock 25 and lever 27 at position 51 in Fig. 7, the valve stem head 35 has moved to a position relative to the latch 38 whereby the toothed end of same engages the face of valve stem head 35 and operates to hold the valve stem 18 and its connected parts in that position.

The longitudinal movement of setting lever 32 as riding on guide 33, and following the plane of same, has been slightly raised, and by further movement of the gas-cock 25 is still further raised until the dog 34 has entirely severed its contact with the face of valve stem head 35, which same is now held to position only by latch 38.

The position of the various parts as shown in Fig. 6 is the result of the movement of the gas-cock to any point beyond that as shown at 51 in Fig. 7 and to the limit of movement as at point 52.

Assuming that the gas is now lighted, giving a flame as at 45 in Fig. 1, the heat from which will actuate the thermostat 23 causing the pliable end of the same to move to a position as shown in Fig. 1, which movement causes the cam 36 on the lower end of thermostat contact 22 to engage pin 37 in latch 38 and rock said lever to cause its toothed end to become disengaged from the face of the valve stem head 35, upon which the tension of spring 42 causes a slight longitudinal movement of the valve stem 18 to bring shim 41 into contact with thermostat contact 22, the space 40 is allowed for this movement, which is necessary in order that the valve stem head 35 may rest against thermostat contact 22 in a position whereby it will clear the latch 38, and be allowed unobstructed passage to its original position upon the cooling of the thermostat 23.

The action of closing the gas-cock 25 to shut off the heater, mechanically returns setting lever 32 to the original position shown in Fig. 4, and as the thermostat 23 cools, it assumes its original position, together with the attached parts to the position shown in Fig. 4, and thus seats the shut-off valve 15 in a closed position. The return movement of valve stem head 35 is not obstructed by dog 34 which being supported by setting lever 32, which is pivotally connected to lever 30, when the gas-cock has been rotated sufficiently to set the shut-off valve head 35, the setting lever 32 has been guided by guide 33 to a point where the dog 34 is out of the path of the valve head 35 during its return movement upon the cooling of the thermostat 23. The dog 34 together with setting lever 32 on which it is mounted may be returned to contact the face of head 35, as shown in Fig. 4, by rotation of gas cock 25 to completely closed position, and in passing head 35 has a ratchet action from being pivotally connected to lever 30.

The automatic shut-off operation of the device is actuated by absence of heat in the gas appliance due to either a cessation of the supply of gas to the burner, as at 44, or from the flame, as at 45, being extinguished from any cause, and upon the consequent absence of heat the thermostat 23 contracts, causing thereby a longitudinal movement of the valve stem 18 in a direction to seat shut-off valve 15 against the valve seat 17, thus positively preventing any passage of gas to outlet chamber 13 which connects to the burner 44. The action of shut-off valve 15 seating in the direction of the flow of gas tends to utilize any pressure of the gas to more firmly seat the same, and to prevent seepage of gas. The thermostat 23 is designed to be constructed to the end that its pliable end shall have a considerably greater radius of movement than the parts which it actuates, thus providing within its expansion and contraction travel a reciprocating movement confined to a limit which will insure the required tension upon the valve stem 18 at either end of the said limited movement.

The form of the device illustrated and described herein is submitted in accordance with statutory requirement by way of exhibiting one form of embodiment of my invention. Various changes, alterations or modifications of the structure may be made without departure from my invention as defined in the following claims.

I claim:

1. The combination with a gas burner and a fuel conduit connected thereto, of a gas-cock and a shut-off valve in said conduit, means operatively interconnecting said valves and operable to open said shut-off valve by operation of said gas-cock in advance of the opening of said gas-cock, means to disengage said interconnecting means from said shut-off valve when said shut-off valve is opened, means to latch said shut-off valve open, and thermostatic means positioned in heating relation to said burner and operative to release said latch means and retain said shut-off valve open when heated.

2. The combination with a gas burner and a fuel conduit connected thereto, of a gas-cock and a shut-off valve in said conduit, means operatively interconnecting said valves and operable by the gas-cock to open said shut-off valve in advance of the opening of said gas-cock, means to latch said shut-off valve open, means to disengage said interconnecting means from said shut-off valve when said shut-off valve is open to permit individual operation of said gas-cock, and thermostatic means positioned in heating relation to said burner and operative to release said latch and retain said shut-off valve open when heated, but to close said shut-off valve when cooled.

3. The combination with a gas burner and a fuel conduit connected thereto, of a gas-cock and a shut-off valve in said conduit, means operatively interconnecting said valves and operable to open said shut-off valve in advance of said gas-cock, means to latch said shut-off valve open, means to disconnect said interconnecting means when said shut-off valve is open, and thermostatic means positioned in heating relation to said burner and operative to release said latch means and retain said shut-off valve open when heated, but to close said shut-off valve when cooled by pressure there against.

4. The combination with a gas burner and a fuel conduit connected thereto, of a gas-cock and a shut-off valve in said conduit, engaging means operable by said gas-cock to engage and open said shut-off valve, latch means to retain said shut-off valve in open position, means to disengage said engaging means when said shut-off valve is open, and thermostatic means positioned in heating relation to said burner and operative to release said latch means and retain said shut-off valve open when heated, but to close said shut-off valve when cooled.

5. The combination with a gas burner and a fuel conduit connected thereto, of a gas-cock and a shut-off valve in said conduit, engaging means operable by said gas-cock to engage and open said shut-off valve in advance of the opening of said gas-cock, latch means to retain said shut-off valve in open position, means to disengage said engaging means from said shut-off valve when said shut-off valve is engaged by said latch means to permit individual operation of said gas-cock, and thermostatic means positioned in heating relation to said burner and operative to release said latch means and retain said shut-off valve open when heated and to close said shut-off valve when cool.

6. The combination with a gas burner and a fuel conduit connected thereto, of a gas-cock and a shut-off valve in said conduit, connecting means operative by said gas-cock to open said shut-off valve, thermostatic means positioned in heating relation to said burner, means to latch said shut-off valve open, means to disconnect said connecting means from said shut-off valve when open, means to disengage said latch means and means to hold said shut-off valve open by said thermostatic means under heat action, and means to close said shut-off valve when said thermostatic means is cool.

WARREN C. PUTNAM.